(12) United States Patent
Peng

(10) Patent No.: US 9,904,574 B2
(45) Date of Patent: Feb. 27, 2018

(54) PARALLEL COMPUTING WITHOUT REQUIRING ANTECEDENT CODE DEPLOYMENT

(71) Applicant: Yang Peng, Shanghai (CN)

(72) Inventor: Yang Peng, Shanghai (CN)

(73) Assignee: SUCCESSFACTORS, INC, South San Francisco, CA (US)

( * ) Notice: Subject to any disclaimer, the term of this patent is extended or adjusted under 35 U.S.C. 154(b) by 67 days.

(21) Appl. No.: 14/580,710

(22) Filed: Dec. 23, 2014

(65) Prior Publication Data

US 2016/0179570 A1    Jun. 23, 2016

(51) Int. Cl.
*G06F 9/46* (2006.01)
*G06F 9/48* (2006.01)

(52) U.S. Cl.
CPC ....................................... *G06F 9/48* (2013.01)

(58) Field of Classification Search
None
See application file for complete search history.

(56) References Cited

U.S. PATENT DOCUMENTS

| | | | | |
|---|---|---|---|---|
| 2002/0091752 A1* | 7/2002 | Firlie | ................... | G06F 9/5027 709/201 |
| 2004/0098447 A1* | 5/2004 | Verbeke | ................ | G06F 9/5055 709/201 |
| 2008/0276262 A1* | 11/2008 | Munshi | ..................... | G06F 8/41 719/328 |
| 2009/0158288 A1* | 6/2009 | Fulton | ................... | G06F 9/4881 718/103 |
| 2011/0225565 A1* | 9/2011 | van Velzen | ........... | G06F 9/5038 717/114 |
| 2012/0054771 A1* | 3/2012 | Krishnamurthy | ..... | G06F 9/4881 718/105 |
| 2012/0089967 A1* | 4/2012 | Varadarajan | .......... | G06F 9/5033 717/136 |
| 2014/0282563 A1* | 9/2014 | Jacobson | .............. | G06F 9/5066 718/102 |

OTHER PUBLICATIONS

IBM Knowledge Center, "Removing duplicate records", Oct. 1, 2011, IBM.*
IBM Knowledge Center, "Filter operator", May 2011, IBM.*

* cited by examiner

*Primary Examiner* — Wynuel Aquino
(74) *Attorney, Agent, or Firm* — Fountainhead Law Group P.C.

(57) ABSTRACT

A method includes identifying a service request including a first and a second computing tasks. The first computing task includes a first program suite having a first data stack and a first code library. The second computing task includes a second program suite having a second data stack and a second code library. The method also includes, executing the first and the second computing tasks on the first and the second computing systems to produce first and second results, respectively. Executing the second computing task includes, transferring the second data stack and the second code library from the first computing system to the second computing system; producing a third data stack by executing the second code library on the second data stack; and transferring the third stack from the second computing system to the first computing system to produce the second results.

14 Claims, 5 Drawing Sheets

400

402 Identify a service request submitted by a user.
　　　The service request includes a first computing task and a second computing task.
　　　The first computing task is associated with a first program suite, stored on the first computing system, for executing the first computing task.
　　　The first program suite includes a first data stack and a first code library.
　　　The second computing task is associated with a second program suite, stored on the first computing system, for executing the second computing task.
　　　The second program suite includes a second data stack and a second code library.

404 In accordance with a first determination that the first computing task is capable of being executed in parallel with the second computing task,
　　　execute the first computing task on the first computing system to produce first results; and
　　　execute the second computing task on a second computing system to produce second results, including:
　　　　　　transferring the second data stack and the second program suite from the first computing system to the second computing system;
　　　　　　producing a third data stack by executing the second program suite on the second data stack; and
　　　　　　transferring the third stack from the second computing system to the first computing system to produce the second results.

406 Complete the service request in accordance with the first results with the second results.

Figure 4

PARALLEL COMPUTING WITHOUT REQUIRING ANTECEDENT CODE DEPLOYMENT

BACKGROUND

The present disclosure relates to computing and data processing, and in particular, to parallel computing without requiring antecedent code deployment.

Processing multiple computing tasks in parallel is important. First, computing resources that might otherwise be idle can be utilized, thereby increasing system efficiency. For example, computing resources already purchased from a cloud provider can be leveraged to expedite a sorting program, which could otherwise take longer to finish if executed entirely locally. Second, related programs may be executed in parallel, rather than in series, and their results provided to a user faster, thereby cutting system response time.

Difficulties abound, however. One of the technical problems is that, leveraging resources available at a remote computer might require local code libraries to be deployed well in advance. This may not be feasible all the time. For example, a local Java function library may need to be copied to and configured at a cloud system before the cloud system can execute relevant programs. This code deployment process, however, might require significant setup efforts by a system administrator and thus might not be available to a software engineer when needed.

There is therefore a need for improved techniques to parallel computing without requiring antecedent code deployment.

SUMMARY

In one embodiment, a computer-implemented method identifies, at a computer system having one or more processors and memory storing one or more programs for execution by the one or more processors, a service request submitted by a user. The service request includes a first computing task and a second computing task. The first computing task is associated with a first program suite, stored on the first computing system, for executing the first computing task; and the first program suite includes a first data stack and a first code library. The second computing task is associated with a second program suite, stored on the first computing system, for executing the second computing task; and the second program suite includes a second data stack and a second code library. The method also includes, in accordance with a first determination that the first computing task is capable of being executed in parallel with the second computing task, executing the first computing task on the first computing system to produce first results; executing the second computing task on a second computing system to produce second results; and completing the service request in accordance with the first results with the second results. Executing the second computing task on the second computing system includes: transferring the second data stack and the second code library from the first computing system to the second computing system; producing a third data stack by executing the second code library on the second data stack; and transferring the third stack from the second computing system to the first computing system to produce the second results.

In another embodiment, a non-transitory computer readable storage medium stores one or more programs comprising instructions for: identifying a service request submitted by a user. The service request includes a first computing task and a second computing task. The first computing task is associated with a first program suite, stored on the first computing system, for executing the first computing task; and the first program suite includes a first data stack and a first code library. The second computing task is associated with a second program suite, stored on the first computing system, for executing the second computing task; and the second program suite includes a second data stack and a second code library. The one or more programs also include instructions for: in accordance with a first determination that the first computing task is capable of being executed in parallel with the second computing task, executing the first computing task on the first computing system to produce first results; executing the second computing task on a second computing system to produce second results; and completing the service request in accordance with the first results with the second results. Executing the second computing task on the second computing system includes: transferring the second data stack and the second code library from the first computing system to the second computing system; producing a third data stack by executing the second code library on the second data stack; and transferring the third stack from the second computing system to the first computing system to produce the second results.

In another embodiment, a computer implemented system comprises one or more computer processors memory; and one or more programs. The one or more programs are stored in the memory and configured to be executed by the one or more processors. The one or more programs include instructions for: identifying a service request submitted by a user. The service request includes a first computing task and a second computing task. The first computing task is associated with a first program suite, stored on the first computing system, for executing the first computing task; and the first program suite includes a first data stack and a first code library. The second computing task is associated with a second program suite, stored on the first computing system, for executing the second computing task; and the second program suite includes a second data stack and a second code library. The one or more programs also include instructions for: in accordance with a first determination that the first computing task is capable of being executed in parallel with the second computing task, executing the first computing task on the first computing system to produce first results; executing the second computing task on a second computing system to produce second results; and completing the service request in accordance with the first results with the second results. Executing the second computing task on the second computing system includes: transferring the second data stack and the second program suite from the first computing system to the second computing system; producing a third data stack by executing the second program suite on the second data stack; and transferring the third stack from the second computing system to the first computing system to produce the second results.

The following detailed description and accompanying drawings provide a better understanding of the nature and advantages of the present disclosure.

BRIEF DESCRIPTION OF THE DRAWINGS

FIG. 4 is an example flow chart illustrating a method for parallel computing without requiring antecedent code deployment in accordance with one embodiment.

DETAILED DESCRIPTION

Figure 1:
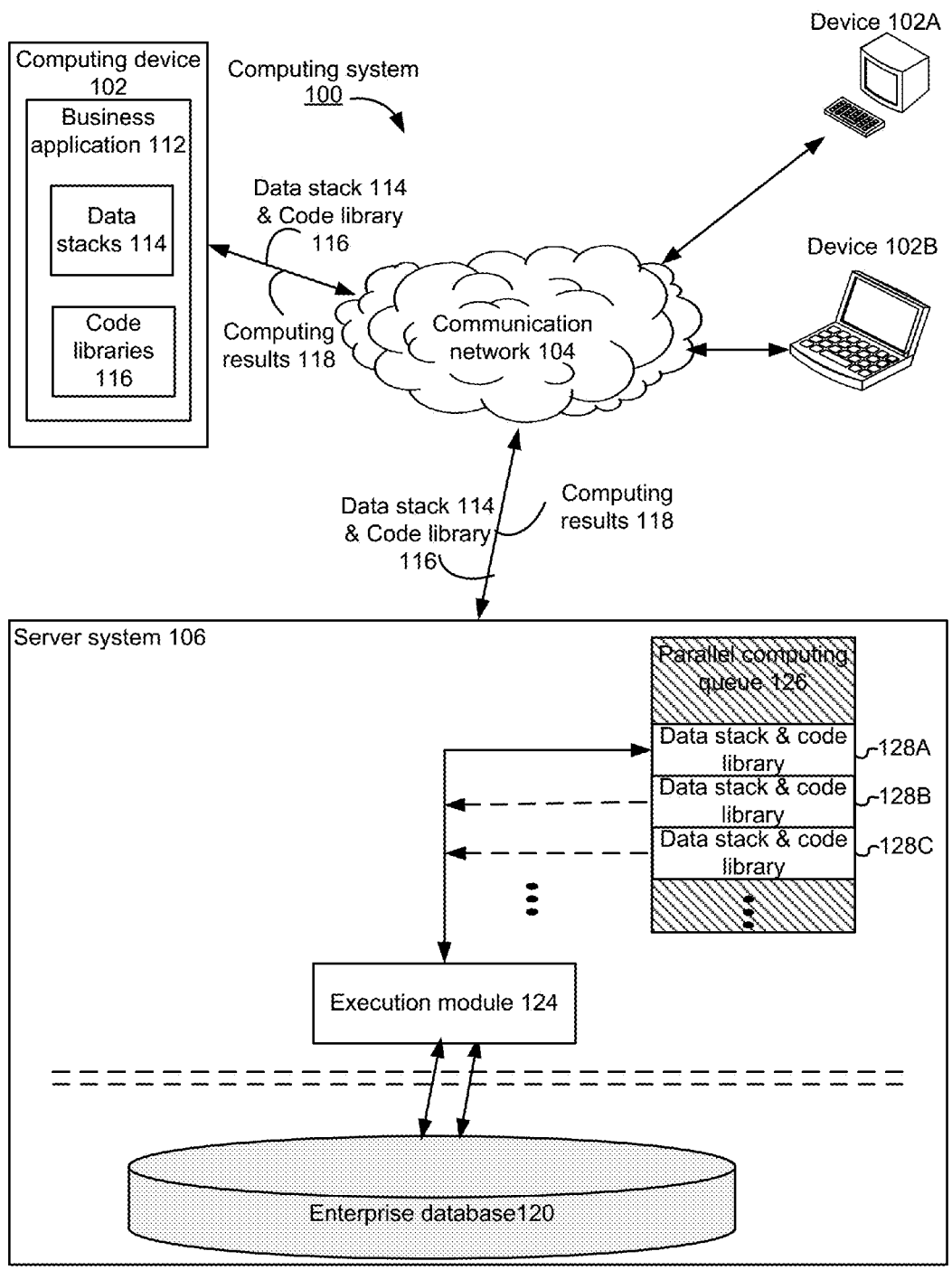
FIG. 1 is an example block diagram illustrating a computing system for parallel computing without requiring antecedent code deployment in accordance with one embodiment.

Described herein are techniques for parallel computing without requiring antecedent code deployment. The apparatuses, methods, and techniques described below may be implemented as a computer program (software) executing on one or more computers. The computer program may further be stored on a non-transitory computer readable medium, such as a memory or disk, for example. A computer readable medium may include instructions for performing the processes described below. In the following description, for purposes of explanation, numerous examples and specific details are set forth in order to provide a thorough understanding various aspects of the present disclosure. It will be evident, however, to one skilled in the art that embodiments of the present disclosure as defined by the claims may include some or all of the features in these examples alone or in combination with other features described below, and may further include modifications and equivalents of the features and concepts described herein.

Introductory Example

The embodiments described herein provide various technical solutions to parallel computing without requiring antecedent code deployment, and in particular to the above-identified technical problems.

As a non-limiting example, after obtaining a service request from a user, a local computer system first determines whether the service request can be broken into two or more smaller jobs (also referred to herein as computing tasks) and whether these two or more jobs can be executed in parallel on multiple computers.

If parallel processing is possible (or desirable), the local computer, in some cases, breaks the service request into two smaller jobs (job A and job B) and configures them for parallel execution on two different computers. In some cases, job A is prepared for execution on the local computer, and job B is prepared for execution on a remote computer system, such as a cloud computer system, for example.

The local computer prepares job B for remote execution by (1) identifying a program suite (a data stack and a code library) necessary for executing job B and (2) transferring the program suite to the cloud computer for remote execution. The remote cloud system then (1) executes job B using the program suite and (2) transfers execution results back to the local computer.

In this case, the program suite (the data stack and the code library) necessary for executing job B is transferred to the cloud system on-the-fly, for example, immediately before job B is executed. Prior deployment of the program suite onto the cloud system therefore may not be required. For example, to process a Java sorting program remotely on a cloud system, a local computer needs not to deploy Java sort function libraries and the data set to be sorted onto the cloud computer in advance. Instead, the Java sort function libraries and the data set can be transferred to the cloud computer shortly before sorting is to take place. The remote sorting can take place as soon as the transfer finishes.

By these ways, prior deployment of program suites may become optional. This is technically advantageous for at least the following reasons. First, because no prior code deployment is required, a user can more flexibly execute his/her programs remotely. For example, the cloud computer system may not need to wait for a cloud system administrator to perform code deployments before running a job. Second, in cases where leveraging cloud resources is important, a user can send as many jobs as possible to as many cloud computers as available for parallel processing, thereby significantly increasing system performance.

Additional Details of Embodiments

Additional details of embodiments are now described in relation to the figures.

FIG. 1 is an example block diagram illustrating a computing system for parallel computing without requiring antecedent code deployment in accordance with one embodiment.

In one embodiment, the computing system 100 includes one or more computing devices 102 (e.g., 102A and 102B), a communication network 104, and a server system 106.

In one embodiment, a computing device 102 enables a user to interact with one or more business applications resident thereon, which in turn communicate with a server system 106, and an enterprise database 120 resident thereon for example.

The computing device 102 obtains a user request in a business application 112 and transmits one or more parts of the user request to the server system 106 for parallel processing. Accordingly, server system may comprise a plurality of computers, which may (or may not) form a cloud computing system, for example. In one embodiment, the computing device 102 is a mobile computing device, such as a laptop computer, a notebook computer, a smart phone, or a tablet computer. In one embodiment, a computing device 102 is a light weight client device (also referred to herein as a client). In one embodiment, the business application 112 is a smart phone app.

The business application 112 may be, for example, an enterprise resource planning (ERP) application, an enterprise access control application, an enterprise access control and violation management application, a regulation management application, an enterprise process control management, an enterprise fraud detection management application, an enterprise risk management application, an enterprise data processing (EDP) application, an enterprise travel planning and expense reimbursement application, an enterprise data management (EDM) application, or an enterprise feedback management (EFM) application.

In one embodiment, a first computer system breaks down a user request into two or more jobs (or portions of the user request) and configures these jobs for parallel processing. In some cases, a user request may include (1) executing a Java program to sort 30,000 data records on a computing device 102, (2) obtaining, via a SQL request, 30 additional records from a user, and (3) merging the sorted 20,000 records with the 30 additional records.

The following example illustrates aspects of the invention using an example where computing device 102 performs parallel processing with server system 106, but it is to be understood that parallel processing may be performed between other computer systems. In this example case, the 30 additional records can be gathered locally by the computing device, while the sorting can be performed remotely by a cloud system. This is advantageous, because a cloud system is often equipped with more computing resources and thus can process complex jobs, such as sorting a large data set, more efficiently than does a local computer.

In one embodiment, the business application 112 includes one or more data stacks 114 and corresponding code libraries 116. A data stack 114 is a data structure including data necessary for executing a job. For example, the data stack for the sorting job discussed above may include a stack of 30,000 records. In some cases, a data stack 114 is a First-In-Last-Out (FILO) stack structure. In other cases, a data stack 114 is a First-In-First-Out (FIFO) queue structure. In still other cases, a data stack 114 is a tree structure, binary or otherwise.

In one embodiment, a code library 116 includes function calls provided by a system or customized by a user. For example, a code library 116 for the above-described sort job may include various sorting algorithms provided by Sun Java, for example, a bubble sort algorithm, a heap sort algorithm, a merger sort algorithm, a shell sort algorithm, a comb sort algorithm, a counting sort algorithm, a bucket sort algorithm, a radix sort algorithm, and a quicksort algorithm. For another example, the code library 116 for the above-described sort job may include data processing routines customized by the user submitting the job, for example, a data cleanse routine, a database interfacing routine, and an output formatting routine.

In some cases, to execute a job remotely on another computer (for example, the server system 106, the device 102A, or the device 102B), one or more data stacks and code libraries on which executing the job relies may need to be transferred to the other computer. For example, to sort the 30,000 records remotely on the cloud system 106, the computing device may need to transfer, from the computing device 102 to the server system 106, (1) the data stack containing the 30,000 records and (2) the Java library containing function/routine calls that may be invoked by the sorting program.

In one embodiment, the communication network 104 interconnects one or more computing devices 102 with each other and with the server system 106. In one embodiment, the communication network 104 optionally includes the Internet, one or more local area networks (LANs), one or more wide area networks (WANs), other types of networks, or a combination of such networks.

In one embodiment, the server system 106 executes jobs submitted by the computer device 102 (in parallel with local execution on the computing device 102) and provides computing results 118 back to the computing device 102. In one embodiment, the server system 106 is a computing cloud (or a portion thereof) that processes service requests submitted by a plurality of computing devices 102, e.g., mobile or otherwise, and provides service responses thereto.

In one embodiment, the server system 106 includes an execution module 124, a parallel computing queue 126, and an enterprise database 120.

The execution module 124 selects a job submitted remotely by another computer, chooses one or more data stacks and code libraries associated with the job from the parallel computing queue 126, and executes the job in accordance therewith. After executing the job, the execution module 124 transmits computing results 118 back to the computer submitting the job.

In one embodiment, a remote compilation feature is enabled. In some cases, the execution module 124 optionally compiles source codes associated with a job (e.g., transferred from the local computer) into compiled codes and then executes or interprets the compiled code in order to execute the job. For example, to execute the Java sorting program discussed above, the server system 106 may compile Java source codes into Java bytecodes and execute these Java bytecodes on the 30,000 data records.

The parallel computing queue 126 manages one or more program suites (data stacks and corresponding code libraries) associated with one or more jobs submitted to the server system 106 (by one or more computing devices). For example, every job submitted to the server system 106 comes with a program suite necessary for its execution, and each program suite includes a data stack 114 and a code library 116. To continue with the example discussed above, when submitting the sorting job to the server system 106, the computing device 102 also submits (1) the data stack including the 30,000 records to be sorted and (2) a Java function library including system- and user-provided Java function calls.

In some cases, once a job is successfully executed, the parallel computing queue 126 removes its corresponding data stack and code library from the server system 106. For example, once the 30,000 records are fully sorted and results transmitted back to the requesting device, the 30,000 records and the sorting functions and routines are removed from the queue 126, so that the resources occupied thereby may be released to and reused by other jobs.

In one embodiment, the enterprise database 120 manages data stored thereon in accordance with user requests, e.g., updating a data table in accordance with a write request or providing data responsive to a read request. In one embodiment, the enterprise database 120 includes one or more databases. In one embodiment, the enterprise database 120 stores and manages data for one or more business (e.g., enterprise) applications. In one embodiment, the enterprise database 120 stores business data, such as sales/business expenses/revenues, customer profiles, and supplier profiles.

In one embodiment, the enterprise database system 120 is implemented using in-memory computing techniques, where data are stored in the main random access memory (RAM) of dedicated servers. These techniques may be advantageous, as in-memory computing helps enterprise/business customers, such as retailers, banks, and utilities, to quickly detect patterns, analyze massive data volumes on the fly, and perform their operations quickly.

Figure 2:
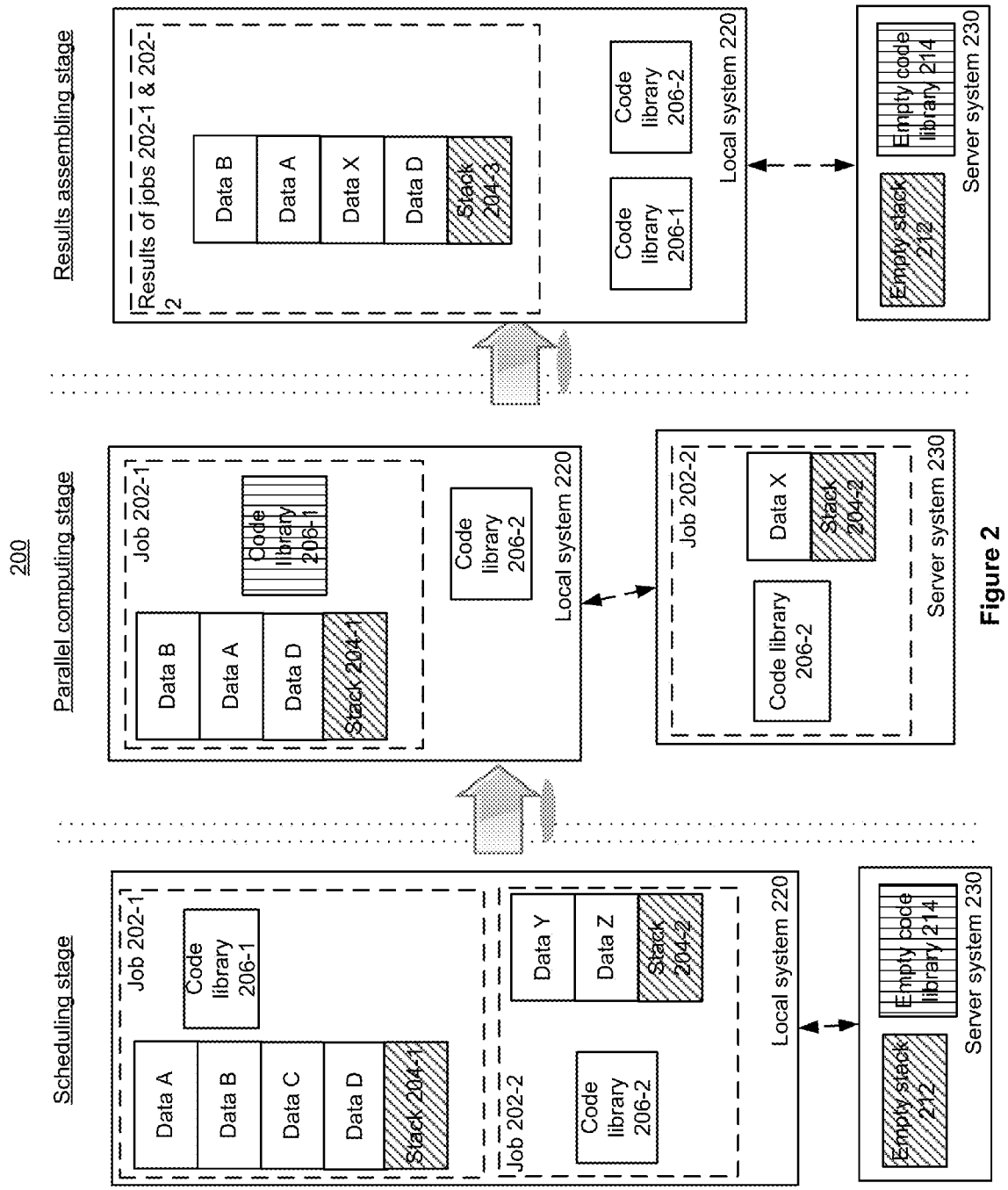
FIG. 2 is an example block diagram illustrating a method for using data stacks and code libraries in a parallel computing environment without requiring antecedent code deployment in accordance with one embodiment.

FIG. 2 is an example block diagram illustrating a method for using data stacks and code libraries in a parallel computing environment without requiring antecedent code deployment in accordance with one embodiment.

During the scheduling stage, the local system 220 has 2 jobs 202-1 and 202-2 awaiting execution. Job 202-1 is associated with a data stack 204-1 and a code library 206-1. In some cases, one or more functions in the code library 206-1 are executed on the stack 204-1 to produce computing results for the job 202-1. For example, a sorting program may invoke a bubble sort algorithm provided in the code library 206-1 when sorting a data array stored in the stack 204-1.

Similarly, the job 202-2 is associated with a data stack 204-2 and a code library 206-2. For example, executing the job 202-2 may include invoking two or more mathematic functions provided in the code library 206-2 to calculate a logarithm using data stored in the data stack 204-2.

During the scheduling stage, the server system 230 in some cases may not have any data stack or code library relating to the jobs 202-1 and 202-2. Therefore, as shown in FIG. 2, during the scheduling stage, the stack 212 and the code library 214 on the server system are empty.

This is technically advantageous, because code deployment on the server system 230 in advance and in anticipation of parallel execution might no longer be necessary. More specifically, in the above example, code libraries 206-1 and 206-2 need not to be deployed on the server system 230 before the jobs 202-1 and 202-2 respectively are submitted by a user. Instead, a user needs to only transfer the code library 201-1 to the server system shortly before submitting the job 202-1 to enable parallel processing thereon.

Dispensing with the requirement for antecedent code deployment may increase system efficiency. For example, a software engineer trying to submit a JavaServer Pages (JSP) program to a cloud system for execution may not be required to (1) first submit a service request to a cloud administrator to have JSP libraries installed on the cloud system and (2) then wait until the JSP libraries are installed, either of which may introduce significant delay and thus hinder productivity.

During the scheduling stage, the local system 220 may decide to cause the job 202-2 to be executed on the server system 230 in parallel with its own local execution of the job 202-1. In some cases, to execute the job 202-2 remotely on the server system 230, the local system 220 first identifies a program suite (such as a data stack and a code library) necessary for the execution and then transfers the program suite to the server system 230.

Next, during the parallel computing stage, the jobs 202-1 and 202-2 are executed in parallel on the local system 220 and the server system 230, respectively.

As shown in FIG. 2, the server system 230 executes the job 202-2 remotely by (1) invoking one or more functions provided in the code library 206-2, and (2) applying the one or more functions to the data stored in the data stack 204-2. After executing the job 202-2, the server system 230 produces the processed data stock 204-2 as part of the remote execution results.

Similarly, the local system 220 executes the job 202-1 locally by (1) invoking one or more functions provided in the code library 206-1, and (2) applying the one or more functions to the data stored in the data stack 204-1. After executing the job 202-1, the local system 220 produces the processed data stock 204-1 as part of the local execution results.

In some cases, the results assembling stage begins after the parallel computing stage. During the result assembling stage, the local execution results and the remote execution results are assembled and combined to produce an overall execution results. On the local system 220, as shown in FIG. 2, the processed data stacks 204-1 and 204-2 are further merged and ranked to produce the data stack 204-3.

In some cases, once remote execution results are transferred back to the local system 220, computing resources previously assigned to execute the job 202-2 are released to other jobs awaiting execution at the server system. For example, the data stack 204-2 and the code library 206-3 are deleted from the server system, releasing cloud storage space and computing units. As shown in FIG. 2, the stack 212 becomes empty again, and the code library 214 also becomes empty.

Figure 3:
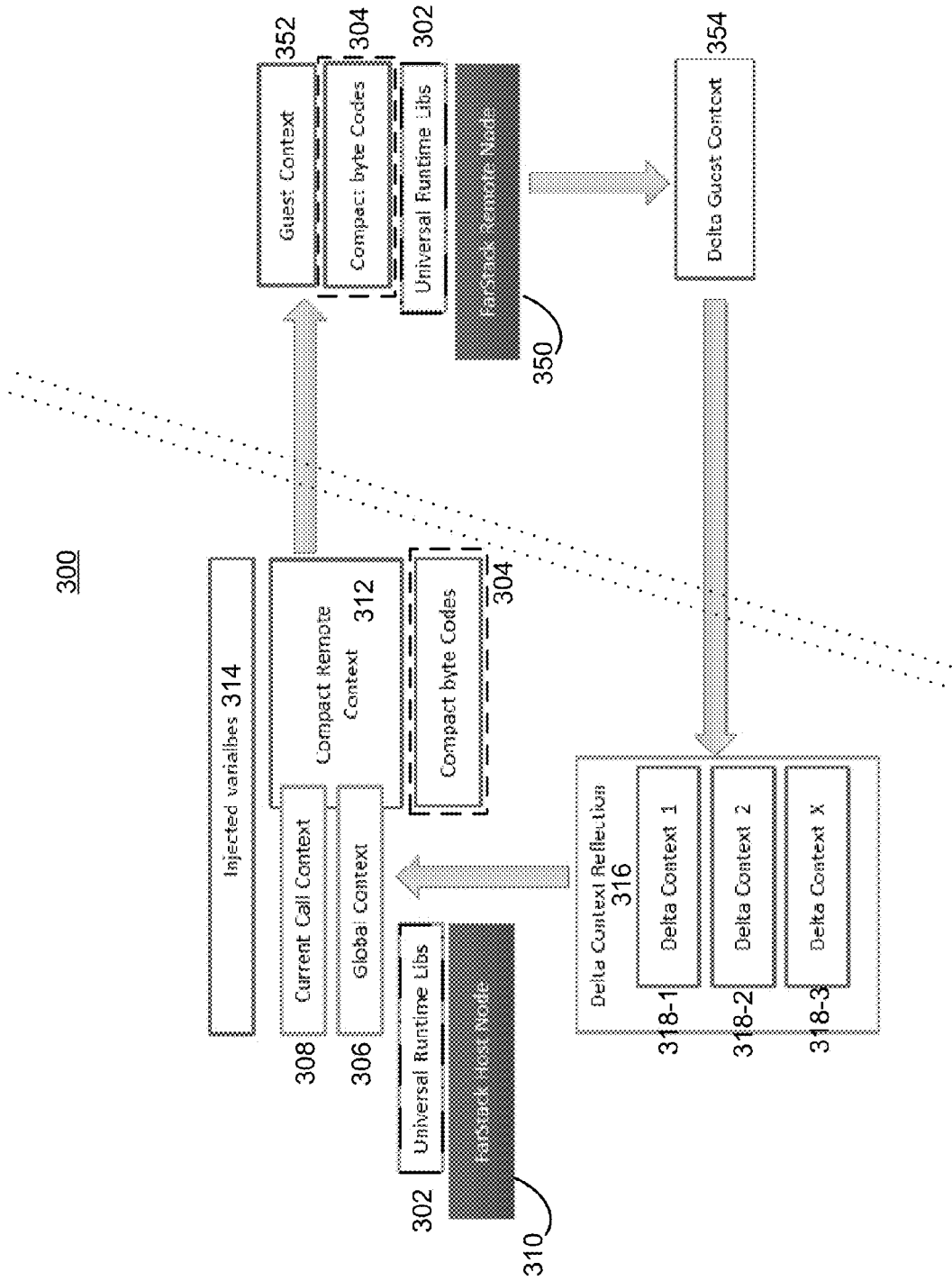
FIG. 3 is an example block chart illustrating an execution life cycle for parallel computing without requiring antecedent code deployment in accordance with one embodiment.

FIG. 3 is an example block chart illustrating an execution life cycle 300 for parallel computing without requiring antecedent code deployment in accordance with one embodiment.

In one embodiment, the execution life cycle 300 includes steps executed at host node (such as a local computer) 310, as well as steps executed at a remote node (such as a cloud/remote computer) 350. Both the local node and the remote node are equipped with one or more processors and memory storing one or more programs for execution by the one or more processors.

In some cases, before a program is transferred from the local node 310 to the remote node 350 for remote execution, the local node first compiles the program into an instruction set executable (such as binary codes) or interpretable (such as bytecodes) by a platform independent virtual machine.

This is advantageous for at least the following reasons. First, bytecodes are portable across multiple programming platforms, thereby making the executions thereof more flexible. Second, bytecodes may be more compact than source codes, thereby making the transfer/replication thereof (from the local computer onto the remote computer) more affordable. Third, compiling an entire program (which may have several subparts) on a single computer may ensure that the compiled program and its subparts all share a same code library, which renders the subsequent transfer/distribution thereof onto several server system less onerous and error-prone.

Alternatively, in other cases, the program is compiled remotely at the remote node 350. This is also advantageous. Because compiling source code may be resource- and time-consuming and thus better handled by a server (or several servers), which is often equipped with more computing resources.

In one embodiment, paralleling processing of a job begins with transferring the program to be remotely executed (including the compact bytecodes 304 and the injected variables 314) from the local node 310 to the remote node 350. In some cases, the injected variables are stored in a data stack.

In some cases, the current call context 308 and the university runtime libraries 302 are also transferred, so as to facilitate the remote execution by providing the remote computer 350 more contextual data for processing the program. For example, the current status of a related local data stack are provided to a remote server, so that the remote server can process the job more.

After receiving the compact bytecodes 304, the current call context 308, and the universal runtime library 302, the remote node 350 produces a guest context (or execution results) that is specific to the host node 310, and transfers the guest context 354 back to the host node 310.

In some cases, the entire processed guest context is transferred. For example, after processing a local data stack, a cloud server produces a modified (or processed) data stack and transfers the entire modified stack back to a local computer.

In some alternative cases, only differences (also called deltas, such as delta guest context 354) a pre-execution guest context and a post-execution guest context are transferred back to the local computer. For example, instead of transferring the entire modified data stack, the remote computer transfers only the changes to the (original) local data stack. This is advantageous, because differences between an original data stack and a processed data stack may be smaller in size and thus more easily transferred. In comparison, transferring the entire processed data stack may be more resource-consuming.

In some cases, after the delta guest context 354 are transferred to the local node 310, they are applied (or reflected) to the global context 306 and to the current call context 308, so as to produce overall execution results. For example, after obtaining remote execution results from the remote node 350, the host node 310 merge them with local execution results, to provide an overall execution results.

In some cases, after overall execution results are produced, the host node 310 provides them to a user or to another computer for further processing.

FIG. 4 is an example flow chart illustrating a method for parallel computing without requiring antecedent code deployment in accordance with one embodiment.

In one embodiment, the method 400 is implemented at a computing system, such as a local computer. In one embodiment, the computing system is equipped with one or more processors and memory storing one or more programs for execution by the one or more processors. In one alternative embodiment, the method 400 is implemented at a remote server system, such as a cloud server.

In one embodiment, the method 400 includes identifying (402) a service request submitted by a user. For example, the local computer may receive a user request to execute a series of jobs.

In some cases, the service request includes a first computing task and a second computing task. For example, a user request to update a local database may include (1) a first job (importing 300 additional records from a local XML file into the local database) and (2) a second job (sorting 20,000 records stored in the local database).

In one embodiment, the first computing task is associated with a first program suite, stored on the first computing system, for executing the first computing task. The first program suite includes a first data stack and a first code library.

To continue with the above example, the first job may be completed by opening the local XML file through a Java Script program and reading the 300 records into the local database. In some cases, during the data import process, the 20,000 data records may be read from the XML into an intermediary data storage, such as data stack, and then inserted into the local database. In alternative cases, the intermediary data storage may be other data structures, such as a data queue or a tree structure.

Reading data records from the XML file into the local database may invoke one or more Java Script function calls provided in a local Java Script function library. In some cases, the local Java function library includes both system provided Java Script functions and user-customized Java Script function.

Similarly, the second computing task is associated with a second program suite, stored on the first computing system, for executing the second computing task, and the second program suite includes a second data stack and a second code library.

To continue with the above example, executing the second job may include running a Java sorting program on the 20,000 data records currently stored on the local computer, using a data stack structure. In alternative cases, the data records may be store in other data structures, such as a queue or a tree structure.

The Java sorting program may invoke one or more Java function calls provided in a local Java function library, for example, a data cleanse routine, a duplicate removal routine, and a heap sort function. In some cases, the local Java function library includes system-provided Java functions, as well as user-customized Java functions. For example, the data cleanse routine may be provided by Sun Java, and the duplicate removal routine may be programmed by the user submitted the sort job (to server his/her unique needs).

The inclusion of user-provided functions/routines makes it more important that data library are transferred and deployed onto the remote system before executing the sort program. The approached disclosed here are advantageous in that these user-provided (and thus may be user-specific) functions and routine are timely enabled on a remote system, just in time for the remote execution.

In other words, a user needs not deploy these user-specific code library onto a remote system well in advance (and in anticipation) of remote execution. For example, a user may not be required to request a cloud administrator to deploy all Java sort algorithms on a cloud system before actual coding takes places.

This is advantageous, because code libraries necessary for remote execution are enabled on a remote system only when it becomes necessary to do so, thereby reducing overhead and delay associated with antecedent code deployment.

For example, a software engineer may not know what functions or routines may be required for remote execution in the future. For these reasons, conventionally, a software engineer is often required to have a cloud administrator install all types of function libraries, including those that may never be invoked in the future. With the above described method, however, by the time a remote execution is to take place, a software engineer would know which functions are required, and need to transfer only those functions to the cloud system to enable remote execution.

This method may further reduce unnecessary cloud resource usage (for which a cloud customer is often required by pay), as well as burden on a cloud administrator. For example, a cloud customer may not be required to enable all kinds of functions (such as Java functions, JSP functions, and ASP functions) on a cloud system, even though in actuality only a small portion (only Java functions in the above example) will be used, because each cloud customer is responsible for deploying their own code libraries onto the cloud system to ensure cloud execution are properly enabled.

In one embodiment, the method 400 also includes, in accordance with a first determination that the first computing task is capable of being executed in parallel with the second computing task (404), executing the first computing task on the first computing system to produce first results; and executing the second computing task on a second computing system to produce second results.

In some cases, after receiving these two jobs (adding new data records and sorting existing data records), the local computer first determines whether they may be executed in parallel. If the parallel processing is not possible (or desirable), the local computer executes these two jobs in series. If, however, the parallel processing is possible (or desirable), the local computer arrange these two jobs for parallel execution.

Arranging jobs for parallel execution, in some cases, includes evaluating which job is more suitable for local execution and which job is more suitable for remote execution. For example, when network performance is sufficient, a complex sorting program may be more efficiently executed by a cloud server, which are often equipped with more computing powers than are local computers. On the other hand, a small read job may be more efficiently executed by a local computer, due to potential data transmission overhead. In the example discussed above, the first job (reading from a local XML file) may be selected for local execution, and the second job may be selected for remote execution. These approaches are advantageous, as the parallel execution of different jobs may be optimized and overall system performance improved.

Upon determining that a job is suitable for local execution, the local computer executes the job and stores execution results locally. In some cases, this is the local execution aspect of the method 400.

Upon determining that a job is suitable for remote execution, the local computer executes the job remotely. In some cases, this is the remote execution aspect of the method 400.

In some cases, the remote execution includes transferring necessary data and code libraries to a remote computer and providing execution results back to the local computer. For example, executing the second computing task on a second computing system to produce second results includes, (A) transferring the second data stack and the second code library from the first computing system to the second computing system; (B) producing a third data stack by executing the second code library on the second data stack; and (C) transferring the third stack from the second computing system to the first computing system to produce the second results.

In some cases, the data and code library necessary for remote execution are deployed onto the remote server system on the fly, rather than in advance. In one embodiment, the second computing system is equipped without the second program suite before the service request is submitted. In the example discussed above, the Java Script program, the 30,000 data records, and the Java Script code library are not transferred and deployed onto the cloud system, until after the local computer decides that the second job will be executed remotely.

These approaches are advantageous for at least the following reasons. Antecedent code deployment by a system administrator on a server system may no longer be necessary for remote execution. This increases flexibility for both cloud customer and cloud provider. Cloud customers can leverage cloud resources more readily, without having to involve a system administrator for code deployment. Nor cloud customer have to limit remote execution to only servers that are currently equipped with appropriate code libraries. On the other hand, cloud providers may no longer have to deploy numerous types of code libraries onto each of their cloud servers in advanced, even though in practice only a fraction of them may be used. Instead, cloud providers only need to provide and maintain sufficient cloud resources. These approaches may significantly reduce licensing cost for cloud provider, as cloud customer who have paid licensing fees for owning their code libraries could reuse them on the server side.

In some cases, the program selected for remote execution is compiled locally. For example, in one embodiment, the method 400 optionally includes compiling second source codes into second compiled codes at the first computing system, and wherein the second program suite includes the second compiled codes. In the example discussed above, the Java Script program may be compiled on the local computer into compiled codes. This may be advantageous. First, compiled codes may be much smaller in size and thus easier to be transferred. Second, local compilation removes the need for a compiler on the remote computer, thereby lowering the requirements for remote executing even further.

In some alternative cases, the program selected for remote execution is compiled remotely. For example, in one embodiment, the second program suite includes second source codes, and the method 400 optionally includes causing the second source codes to be compiled by the second computing system. In the example discussed above, the Java Script program's source code may be transferred to and compiled by the remote computer, into compiled codes. This may be also advantageous. First, when data transmission speed is not a concern, a server computer may be equipped with more computing power and thus capable of handling a job more efficiently. Second, remote compilation removes the need for a compiler on the local computer, thereby lowering the requirements for local computers even further.

In one embodiment, the method 400 includes completing (406) the service request in accordance with the first results with the second results. For example, once results from the local execution and those from the remote execution become available, they are processed to provide a response to the service request. In some cases, remote execution results are transmitted to the local computer first and combined with the local execution results. For example, as shown in FIG. 2, results stored in the processed data stack 204-1 (data B, A, and D) are merged with the processed data stack 204-2 (data X) and ranked to provide the stack 204-3 (data B, A, X, and D).

In one embodiment, the method 400 optionally includes removing the third data stack and the second code library from the server system. For example, as shown in FIG. 2, after transmitting remote execution results to the local system 200, the server system 230 removes the remote execution results in order to release system sources occupied thereby.

In one alternative embodiment, the third data stack and the second code library are maintain on the server system for a predefined time period. For example, the server system 230 may keep the remote execution results for a certain amount of time, in order to provide remote execution results backup. For example, the local system 200 may experience a system failure or reboot, thereby losing remote execution results. In these cases, the server system may provide a backup copy of the remote execution results. These approaches are advantageous, as they avoid a potentially costly rerun of the remote execution, thereby increasing system stability and efficiency.

Figure 5:
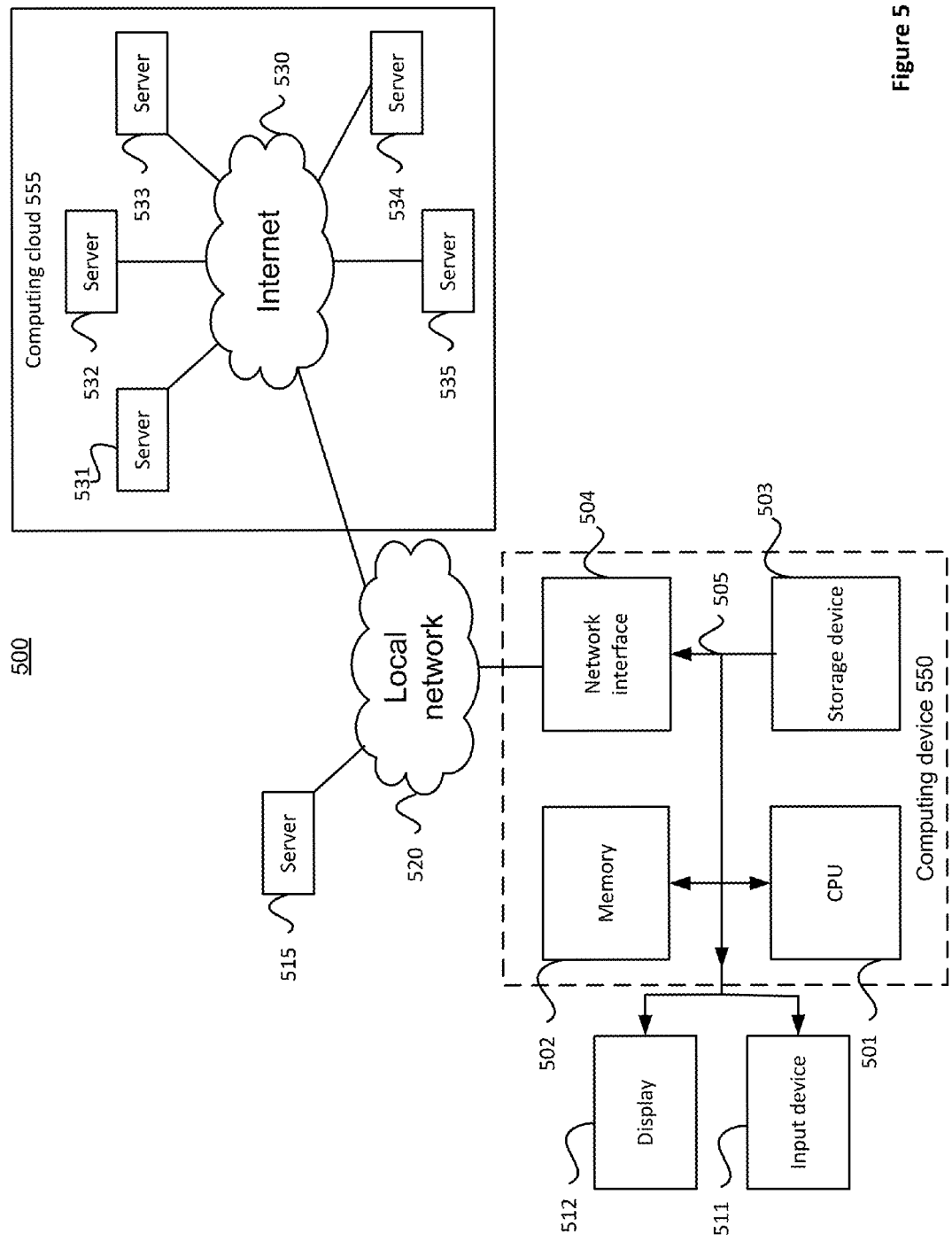
FIG. 5 is an example block diagram illustrating a computing system for parallel computing without requiring antecedent code deployment in accordance with one embodiment.

FIG. 5 is an example block diagram illustrating a computing system for parallel computing without requiring antecedent code deployment in accordance with one embodiment.

As shown in FIG. 5, in one embodiment, the computing device 550 includes a bus 505 or other communication mechanism for communicating information, and a processor 501 coupled with the bus 505 for processing information. In one embodiment, the computing device 550 also includes a memory 502 coupled to bus 505 for storing information and instructions to be executed by processor 501 (CPU), including information and instructions for performing the techniques described above, for example. In one embodiment, the memory 502 may also be used for storing variables or other intermediate information during execution of instructions to be executed by the processor 501. In one embodiment, the memory 502 includes, but is not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In one embodiment, the storage device 503 may include source code, binary code, or software files for performing the techniques above, for example. The storage device 503 and the memory 502 are both examples of computer readable mediums.

In one embodiment, the computing device 550 may be coupled via the bus 505 to a display 512, such as a cathode ray tube (CRT) or liquid crystal display (LCD), for displaying information to a user. An input device 511 such as a keyboard and/or mouse is coupled to the bus 505 for communicating information and command selections from the user to the processor 501. The combination of these components allows the user to communicate with the computing device 550. In some systems, the bus 505 may be divided into multiple specialized buses.

In one embodiment, the computing device 550 includes a network interface 504 coupled with the bus 505. In one embodiment, the network interface 504 provides two-way data communications between the computing device 550 and the local network 520. In one embodiment, the network interface 504 includes a digital subscriber line (DSL) or a modem to provide data communication connection over a telephone line, for example. Another example of the network interface 504 is a local area network (LAN) card to provide a data communication connection to a compatible LAN. Wireless links are another example. In any such implementation, the network interface 504 sends and receives electrical, electromagnetic, or optical signals that carry digital data streams representing various types of information.

In one embodiment, the computing device 550 sends and receives information, including messages or other interface actions, through the network interface 504 across a local network 520, an Intranet, or the Internet 530. In one embodiment, the local network, the computing device 550 communicates with a plurality of other computer machines, such as a server 515 or a computing cloud 555. In one embodiment, the computing device 550 and server computer systems represented by the server 515 form a cloud computing network, which may be programmed with processes described herein. In the Internet example, software components or services may reside on multiple different computing systems 510 or servers 531-535 across the network. In one embodiment, the processes described above are implemented at computing cloud 555, which includes one or more servers from the servers 531-535. In one embodiment, the server 531 transmits actions or messages from one component, through the Internet 530, the local network 520, and the network interface 504 to a component of the computing device 550. In one embodiment, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
    at a first computing system having one or more processors and memory storing one or more programs for execution by the one or more processors:
    identifying a service request submitted by a user, wherein the service request includes a first computing task and a second computing task;
    the first computing task is associated with a first program suite, stored on the first computing system, for executing the first computing task;
    the first program suite includes a first data stack and a first code library;
    the second computing task is associated with a second program suite, stored on the first computing system, for executing the second computing task; and
    the second program suite includes a second data stack and a second code library;
    in accordance with a first determination that the first computing task is capable of being executed in parallel with the second computing task,
    executing the first computing task on the first computing system to produce first results, including executing the first code library on the first data stack to produce a first modified data stack, wherein the first modified data stack comprises a first tree structure of a binary format;
    compiling second source codes into second compiled codes at the first computing system, wherein the second program suite includes the second compiled codes;
    transferring the second computing task, the second program suite, and first context information from the first computing system to a second computing system; and
    executing, in parallel with the first computing task, the second computing task on the second computing system to produce second results, the second results comprising:
    a second modified data stack produced by executing the second code library on the second data stack, wherein the second modified data stack comprises a second tree structure of the binary format and the second results comprise only changes in the second modified data stack over the second data stack; and
    transferring the second results from the second computing system to the first computing system; and completing the service request at the first computing system by merging the first tree structure of the first modified data stack of the first results with the second tree structure of the second modified data stack of the second results based upon second context information.

2. The method of claim 1, wherein the second computing system is without the second program suite before the service request is submitted by the user.

3. The method of claim 1, further comprising removing the second modified data stack and the second code library from the second computing system to release resources associated with the second computing task.

4. The method of claim 1, wherein the second code library comprises user provided function calls specific to the second computing task.

5. The method of claim 1, wherein the second computing system is a cloud system.

6. A non-transitory computer readable storage medium, which is not a signal bearing medium, storing one or more programs, the one or more programs comprising instructions, which when executed by a computing system with one or more processors, cause the computing system to execute a method of:
identifying a service request submitted by a user, wherein the service request includes a first computing task and a second computing task;
the first computing task is associated with a first program suite, stored on the first computing system, for executing the first computing task;
the first program suite includes a first data stack and a first code library;
the second computing task is associated with a second program suite, stored on the first computing system, for executing the second computing task; and
the second program suite includes a second data stack and a second code library; and
in accordance with a first determination that the first computing task is capable of being executed in parallel with the second computing task, executing the first computing task on the first computing system to produce first results, including executing the first code library on the first data stack to produce a first modified data stack, wherein the first modified data stack comprises a first tree structure of a binary format;
compiling second source codes into second compiled codes at the first computing system, wherein the second program suite includes the second compiled codes;
transferring the second computing task, the second program suite, and first context information from the first computing system to a second computing system; and
executing, in parallel with the first computing task, the second computing task on the second computing system to produce second results, the second results comprising:
a second modified data stack comprising a second tree structure of the binary format produced by executing the second code library on the second data stack, wherein the second results comprise only changes in the second modified data stack over the second data stack; and
transferring the second results from the second computing system to the first computing system;
completing the service request at the first computing system by merging the first tree structure of the first modified data stack of the first results with the second tree structure of the second modified data stack of the second results based upon second context information.

7. The non-transitory computer readable storage medium of claim 6, wherein the second computing system is without the second program suite before the service request is submitted by the user.

8. The non-transitory computer readable storage medium of claim 6, wherein the one or more programs further comprise instructions for: removing the second modified data stack and the second code library from the second computing system to release resources associated with the second computing task.

9. The non-transitory computer readable storage medium of claim 6, wherein the second code library comprises user provided function calls specific to the second computing task.

10. The non-transitory computer readable storage medium of claim 6, wherein the second computing system is a cloud system.

11. A computer system, comprising:
one or more processors;
memory; and
one or more programs, wherein the one or more programs are stored in the memory and configured to be executed by the one or more processors, the one or more programs including instructions for:
identifying a service request submitted by a user, wherein the service request includes a first computing task and a second computing task;
the first computing task is associated with a first program suite, stored on the first computing system, for executing the first computing task;
the first program suite includes a first data stack and a first code library;
the second computing task is associated with a second program suite, stored on the first computing system, for executing the second computing task; and
the second program suite includes a second data stack and a second code library; and
in accordance with a first determination that the first computing task is capable of being executed in parallel with the second computing task, executing the first computing task on the first computing system to produce first results, including executing the first code library on the first data stack to produce a first modified data stack comprising a first tree structure of a binary format;
compiling second source codes into second compiled codes at the first computing system, wherein the second program suite includes the second compiled codes;
transferring the second computing task, the second program suite, and first context information from the first computing system to a second computing system; and
executing, in parallel with the first computing task, the second computing task on the second computing system to produce second results, the second results comprising:
a second modified data stack comprising a second tree structure of the binary format produced by executing the second code library on the second data stack, wherein the second results comprise only changes in the second modified data stack over the second data stack; and
transferring the second results from the second computing system to the first computing system;
completing the service request at the first computing system by merging the first tree structure of the first modified data stack of the first results with the second tree structure of the second modified data stack of the second results based upon second context information.

12. The system of claim 11, wherein the second computing system is without the second program suite before the service request is submitted by the user.

13. The system of claim 11, wherein the one or more programs further comprise instructions for: removing the second modified data stack and the second code library from the second computing system to release resources associated with the second computing task.

14. The system of claim 11, wherein the second code library comprises user provided function calls specific to the second computing task.

\* \* \* \* \*